United States Patent [19]
Poe

[11] 3,918,130
[45] Nov. 11, 1975

[54] INITIALLY ONE PIECE REMOVABLE FASTENER

[75] Inventor: L. Richard Poe, Los Angeles County, Calif.

[73] Assignee: Hartwell Corporation, Los Angeles, Calif.

[22] Filed: Dec. 11, 1974

[21] Appl. No.: 531,732

Related U.S. Application Data

[63] Continuation-in-part of Ser. No. 436,495, Jan. 25, 1974, abandoned.

[52] U.S. Cl. .................................. 24/73 P; 85/72
[51] Int. Cl.² ........................................ A44B 21/00
[58] Field of Search ............ 85/72, 81, 83, 84, 5 R, 85/76, 80; 24/73 P, 73 PF, 73 HS, 73 PM, 73 MF, 73 D, 211 K, 214; 174/138 D, 138 R, 153 R; 248/27

[56] References Cited
UNITED STATES PATENTS

| | | |
|---|---|---|
| 3,112,547 | 12/1963 | Poe ....................................... 24/211 |
| 3,417,438 | 12/1968 | Schuplin .............................. 24/73 P |
| 3,811,154 | 5/1974 | Pestka et al. ........................ 24/73 P |
| 3,852,849 | 12/1974 | Pestka .................................. 24/73 P |
| 3,854,374 | 12/1974 | Boyle et al. ............................. 85/84 |

Primary Examiner—Geo. V. Larkin
Attorney, Agent, or Firm—Lyon & Lyon

[57] ABSTRACT

A fastener for removably joining two members, the fastener comprising an expansible grommet and an expander plunger initially joined as a single piece by a frangible connection which is broken in the course of installation of the fastener to permit relative movement of the grommet and plunger in order to join the two members, the grommet and plunger remaining connected in such a manner that as the plunger is moved between an extended and retracted position, the grommet expands and contracts for releasably connecting the two members while the plunger and grommet remain interconnected, and, if desired, the grommet may remain attached to one of the two members intended to be joined by the fastener.

12 Claims, 30 Drawing Figures

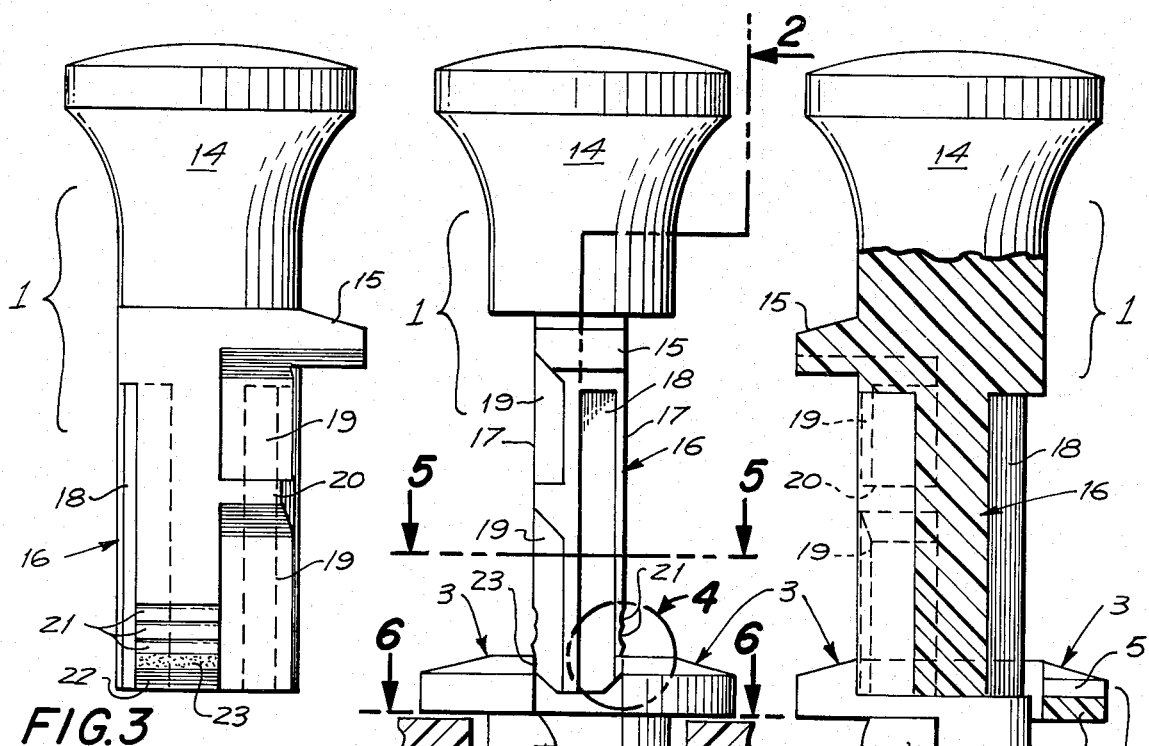
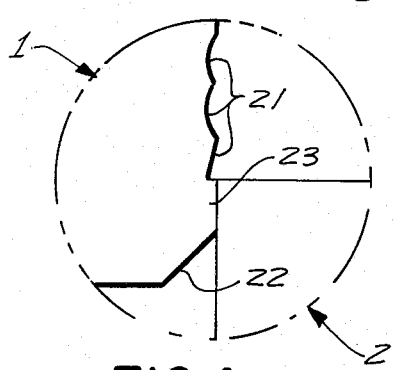
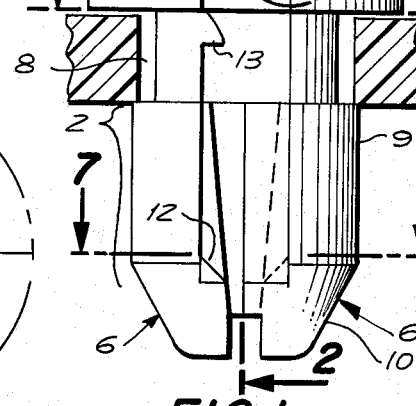
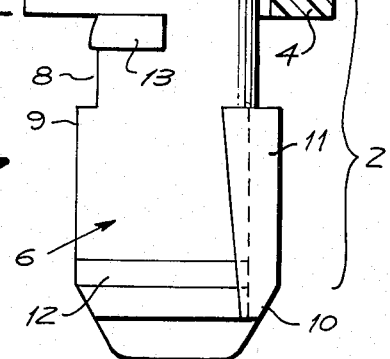
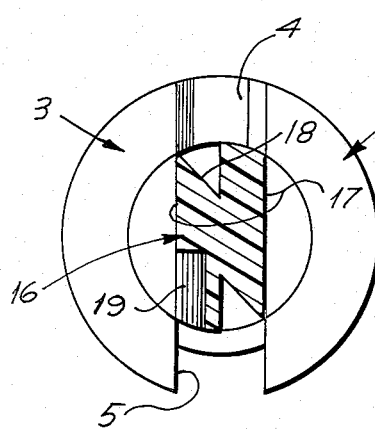
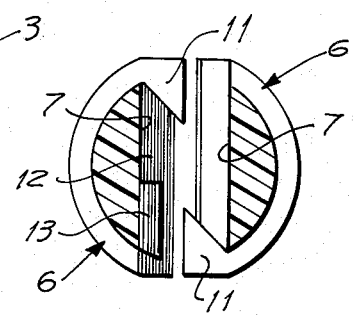
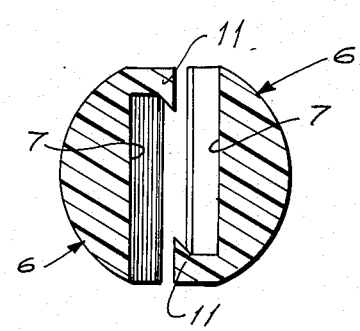

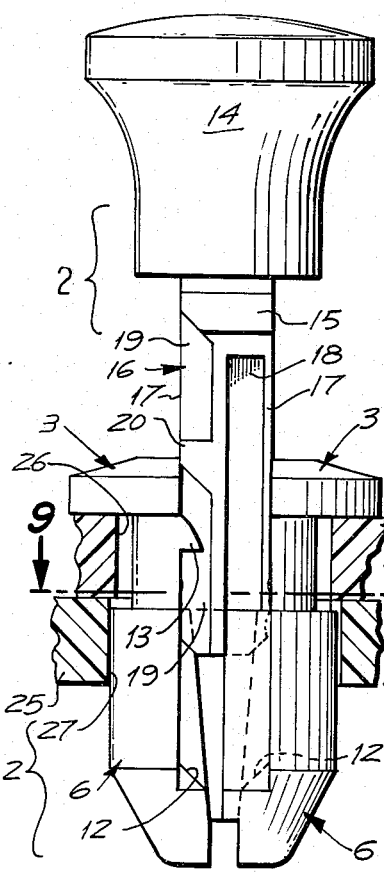
FIG. 8
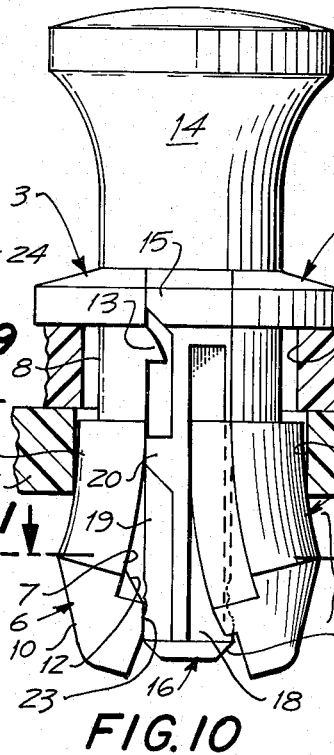
FIG. 10
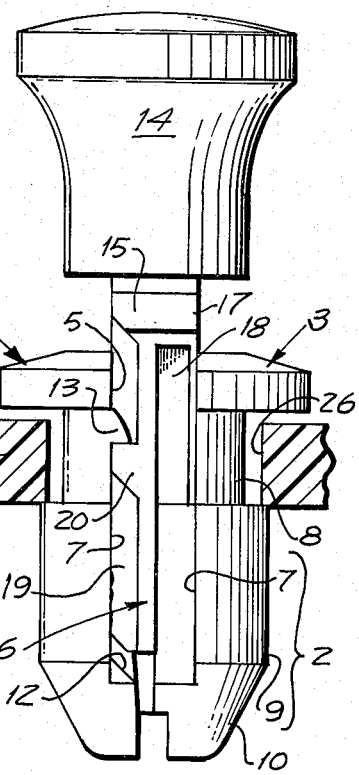
FIG. 12
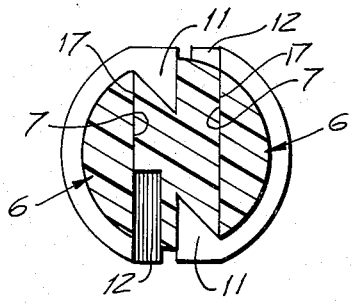
FIG. 9
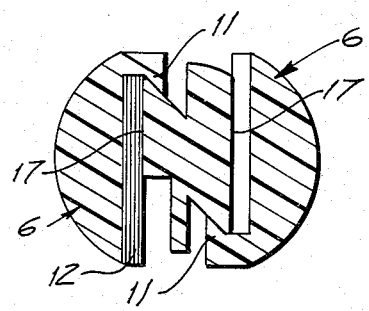
FIG. 11
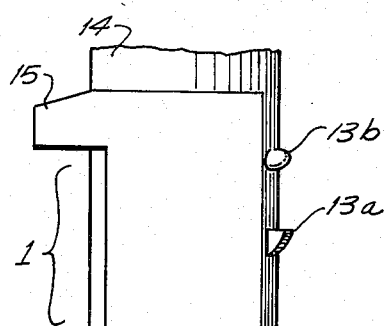
FIG. 13
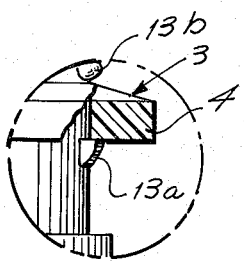
FIG. 14
FIG. 15

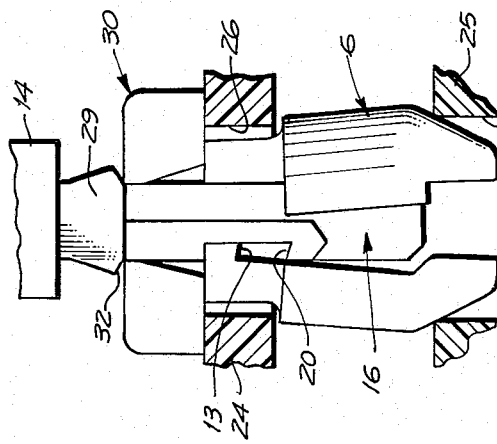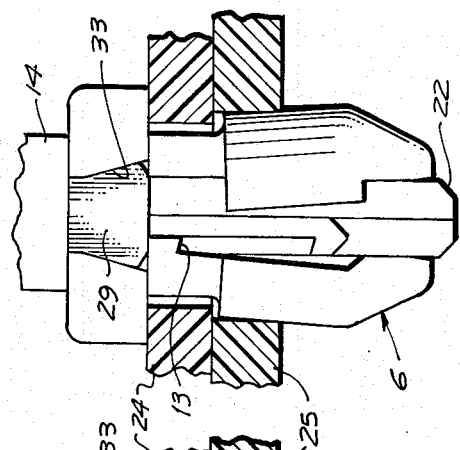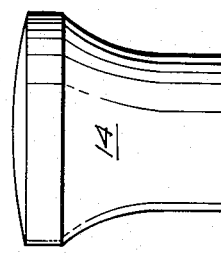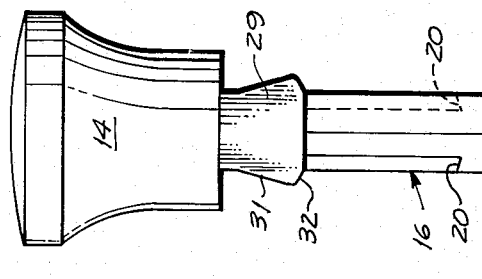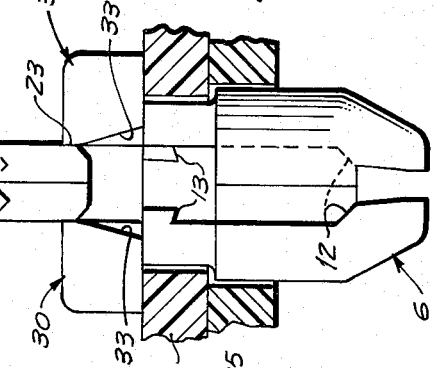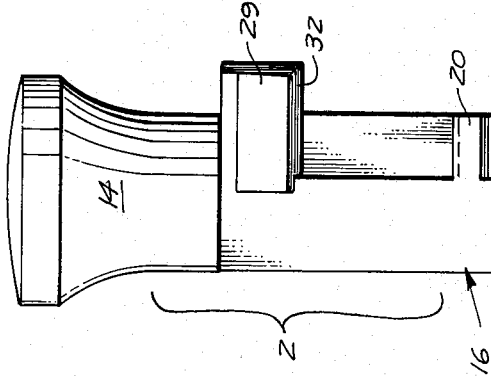

INITIALLY ONE PIECE REMOVABLE FASTENER

This application is a continuation-in-part application of Parent Ser. No. 436,495 filed Jan. 25, 1974 and entitled INITIALLY ONE PIECE REMOVABLE FASTENER, abandoned as of Dec. 20, 1974.

BACKGROUND OF THE INVENTION

Expansible fasteners manufactured under one or both U.S. Pat. Nos. 3,112,547 and 3,116,528 for removably securing a first member to a second member have met with substantial success. This type of fastener initially comprises two separated pieces, one an expansible grommet, the other an expanding plunger. Before use, the grommet is inserted in a perforation provided in the first member and is dimensioned so as to resist removal therefrom. The plunger is then inserted into the grommet, and interlocked therewith but permitting limited axial extension and retraction of the plunger. This movement is used to expand and contract the grommet so that, when the plunger is retracted, the grommet may be inserted in a perforation provided in a second member whereupon the plunger may be forced to its extended position to expand the grommet and secure the two members together. Subsequent retraction of the plunger permits disengagement of the two members.

The fact that the fastener is made in two separate parts poses the inherent problem that one part might be lost or be the wrong size as to length or diameter. Also the cost of installation, manufacturing and stocking the two parts is greater than would be the case if the fastener could be molded as a single part. Blind rivets such as shown in U.S. Pat. No. 3,417,438 have been made which are initially a single part; however, once they have been forced into their securing position they cannot subsequently be separated without tools, and often without destruction; that is, such rivet-like fasteners cannot be reused. For example, the rivet-like fasteners cannot be used to latch a door or access panel which must be opened or closed repeatedly by hand. Such fasteners have no means for permanent mounting within the removable panel.

SUMMARY OF THE INVENTION

The present invention is directed to a fastener which permits molding an expansible grommet and an expander plunger as a single piece while retaining the advantages of the two piece fastener referred to above, and is summarized in the following objects:

First, to provide a removable fastener which may be molded as a single piece without the use of cores or the like so as to permit molding in large volume and at low cost.

Second, to provide an initially single piece removable fastener which, once the initial connection between the grommet and the plunger is broken, the plunger is forced into an interlocking relation with the grommet which, however, permits limited longitudinal relative movement of the two parts so that the grommet may be expanded to secure a pair of members together or permitted to contract to permit separation of the two members.

Third, to provide an embodiment of the removable fastener which includes a side web at the head end of the grommet which maintains the grommet as a single piece, and which incorporates a novel slide connection between the grommet and plunger serving to maintain the grommet in operative relation to the plunger and to limit relative axial movement.

Fourth, to provide another embodiment of the removable fastener which includes an end web for the grommet to maintain the two portions of the grommet as a single piece, and further includes a connection between the plunger and grommet to limit relative axial movement.

Fifth, to provide a further embodiment of the removable fastener wherein both a side web and an end web are provided to maintain the grommet as a single piece.

Sixth, to provide a further embodiment which, when utilized to join two members in which the grommet and plunger remain attached to one of the members and the grommet is removably joined to the other member, and is provided with means to insure re-engagement with the other member even though the grommet may have become set in an expanded condition.

DESCRIPTION OF THE DRAWINGS

FIGS. 1 through 11 illustrate one embodiment of the initially one piece removable fastener.

FIG. 1 is an enlarged side view thereof showing the fastener in its initial condition before the grommet and plunger are separated, and indicating fragmentarily one of the members intended for connection by the fastener.

FIG. 2 is a longitudinal sectional view thereof taken through 2—2 of FIG. 1.

FIG. 3 is a side view of the plunger as it would appear if removed from the grommet.

FIG. 4 is a further enlarged fragmentary sectional view taken within circle 4 of FIG. 1 showing the initial integral connection between the grommet and the plunger.

FIGS. 5, 6 and 7 are transverse sectional views taken through 5—5, 6—6 and 7—7 respectively of FIG. 1.

FIG. 8 is a side view corresponding to FIG. 1 showing the relationship of the grommet and the plunger immediately following shearing of the connection therebetween, and indicating fragmentarily the two members intended for connection.

FIG. 9 is a transverse sectional view taken through 9—9 of FIG. 8.

FIG. 10 is a side view corresponding to FIGS. 1 and 8 showing the fastener in its expanded or fastening position.

FIG. 11 is a transverse sectional view thereof taken through 11—11 of FIG. 10.

FIG. 12 is a side view corresponding to FIGS. 1, 8 and 10 showing the grommet in its retracted position and illustrating the manner in which the grommet and plunger are interlocked for repeated use, one of the members to be joined shown retained by the grommet.

FIG. 13 is a fragmentary side view, taken in the same direction as FIG. 2 showing an alternative releasable latching lug and stop lug.

FIG. 14 is a fragmentary side view thereof taken within circle 14 of FIG. 13 showing the latching and stop lugs in intermediate positions.

FIG. 15 is another view also taken within circle 14 of FIG. 13 showing the latching and stop lugs in the locations assumed when the fastener is secured.

FIG. 16 is a side view showing the grommet and the plunger in their initial integrally connected position.

FIGS. 17, 18, 19 and 20 are transverse sectional views taken through 17—17, 18—18, 19—19 and 20—20 of FIG. 16.

FIG. 21 is a side view similar to FIG. 16 showing the grommet and the plunger immediately after severance of the integral connection therebetween, and indicating fragmentarily one of the members to be fastened.

FIG. 22 is another side view similar to FIG. 21 showing the plunger in its fully inserted position and the grommet expanded to its fastening position, and indicating fragmentarily both of the members as they appear when secured together.

FIG. 23 is a side view corresponding to FIGS. 16, 21, and 22 showing the grommet in its relaxed condition and the plunger in its retracted condition.

FIG. 24 is a longitudinal sectional view thereof taken through 24—24 of FIG. 23.

FIGS. 25 through 30 illustrate a third embodiment of the initially one piece removable fastener, wherein:

FIG. 25 is a fragmentary side view of the plunger.

FIG. 26 is a transverse sectional view of the plunger.

FIG. 27 is a side view of the entire fastener in its initial one piece condition shown inserted in a pair of plates intended to be secured together.

FIG. 28 is a view similar to FIG. 27 showing the fastener after separation of the plunger and grommet but before expansion of the grommet.

FIG. 29 is a further fragmentary view similar to FIGS. 27 and 28 showing the grommet in its final expanded state.

FIG. 30 is a fragmentary side view showing the grommet after removal and positioned for re-engagement.

Figure 16:
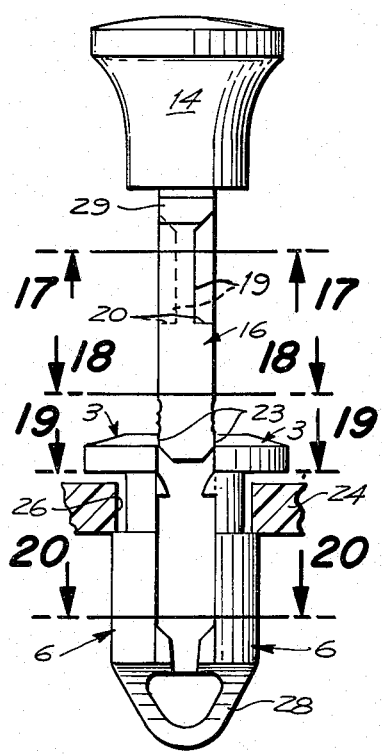
FIGS. 16 through 24 illustrate a second embodiment of the initially one piece removable fastener.
Figure 21:
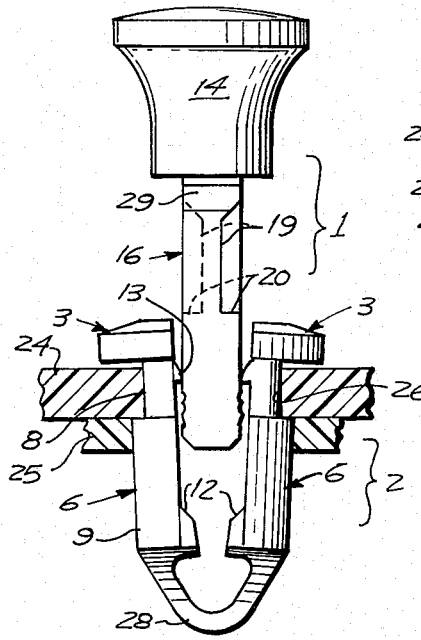
Figure 22:
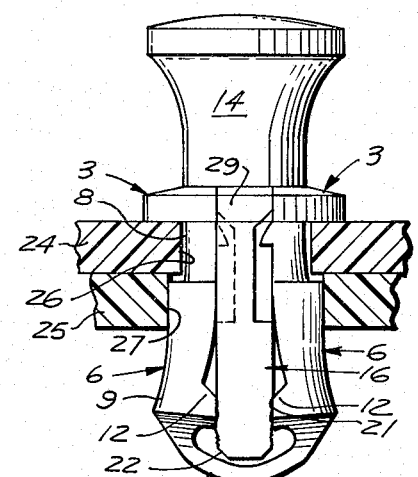
Figure 17:
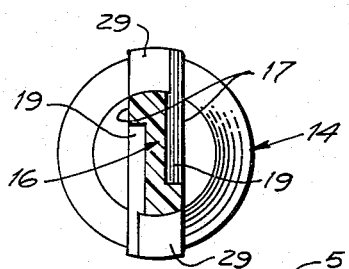

Reference is first directed to the embodiment shown in FIGS. 1 through 12. The removable fastener here illustrated includes an expansible grommet 1 and an expander plunger 2.

The grommet 1 includes a pair of complementary head portions 3 peripherally connected by a web 4 and otherwise forming therebetween a recess 5.

Extending from the head portions 3 is a pair of complementary stem portions 6 having confronting flat walls 7. In combination the stem portions form a reduced cylindrical subportion 8 adjacent the head portions 3, and an enlarged cylindrical portion 9 and a conical end subportion 10.

The confronting walls 7 are provided in the regions of the cylindrical subportion 9 and conical end subportion 10 with opposed longitudinally extending retainer flanges 11. In the region of the conical end subportion 10, the stem portions 6 form upwardly facing cam shoulders 12.

One or both of the stem portions 6 are provided adjacent the corresponding head portion 3 with a downwardly facing stop lug 13.

The expander plunger 2 includes a handle head 14, the underside of which is provided with a projection 15 intended to be received in the recess 5 of the grommet. The plunger also includes a shank 16 extending from the handle head and having flat sides 17 intended for sliding fit between the flat walls 7.

The shank 16 is provided with opposed V-channels 18 for interengagement with the retainer flanges 11. Also the shank is provided with tandem related latching recess portions 19 between which is interposed a stop shoulder 20.

Near its extremity, the shank is provided on opposite sides with a series of retaining recesses 21 and the extremity of the shank is beveled as indicated by 22 for engagement with the cam shoulders 12.

As shown best in FIG. 4, the expansible grommet 1 and expander plunger 2 are initially joined by a pair of frangible connections 23 located on the shank 16 between the retaining recesses 21 and its beveled extremity 22 and also located at confronting sides of the head portions 3 adjacent their outer surfaces.

The removable fastener is intended to removably secure a first member 24 to a second member 25 having respectively perforations 26 and 27. These members may take various forms for example, the first member may be a door panel and the second member, a door frame panel. Also one or both members may be tie straps; many other uses exist.

It is usually desirable that the fastener be permanently attached to the first member 24. This may be accomplished by providing the reduced cylindrical subportion 8 and dimensioning the enlarged cylindrical subportion 9 so as to be slightly greater than the perforation 26 in the first member 24. The second perforation 27 is made slightly larger to fit freely over the enlarged cylindrical portion 9.

Operation of the releasable fastener shown in FIGS. 1 through 12 is as follows:

Initially the fastener is a single piece as shown in FIGS. 1 and 2. The grommet stem portions 6 are first inserted in the perforation 26 provided in the first member 24. The stem portions 6 occupies the region surrounding the reduced cylindrical subportion 8. This is accomplished without severing the frangible connections 23. The first member 24 is then placed over the second member 25 with the perforation 27 in alignment with the perforation 26 and sufficient force is exerted on the handle head 14 of the expander plunger 2 to cause the frangible connections 23 to sever and permit the shank 16 to move between the stem portions 6 as illustrated in FIG. 8. Continued movement causes the extremity of the shank 16 to engage the cam shoulders 12 so as to spread the stem portions 6 as illustrated in FIG. 10. Spreading of the stem portions brings the cylindrical subportion 9 into contact with opposite sides of the perforation 27 and to diverge outwardly from the perforation so that the two members 24 and 25 are firmly secured together.

During this movement the stop shoulder 20 snaps past the stop lug 13 as shown in FIG. 10 so as to be retained in a latching recess portion 19 adjacent the handle head 14. If the expander plunger 2 is now pulled outwardly with respect to the grommet 1 the extremity of the shank 16 disengages the cam shoulders 12 permitting the stem portions 6 to spring toward each other so that the stem portions may be withdrawn from the perforation 27 in the member 25 as shown in FIG. 12. Inasmuch as the lug 13 is retained in the latching recess, the grommet and plunger remain attached and the stem portions 6 may be laterally contracted or expanded for securing and releasing the second member 25.

The retainer flanges 11 and V-channels 18 interlock to prevent excessive spreading of the stem portions 6. In this regard, it will be noted that the V-channels 18 have a tapered wall to permit adequate spreading as may be seen by comparison of FIGS. 7 and 11.

Reference is directed to FIGS. 13, 14 and 15. In place of the stop lug 13 provided on the wall 7 of the grommet, a stop lug may be located externally on the shank 16 as indicated by 13a and positioned for engagement with the web 4 or adjacent head portion 3 to limit outward movement of the shank as shown in FIG. 15, and prevent separation of the grommet 1 and shank 2.

In addition, a projection 13b may be provided on the shank 16 of the plunger 2. The projection 13b is so dimensioned and shaped that it may be forced in either direction past the web 4 or adjacent the head portion 3 as indicated by comparison of FIGS. 14 and 15. When installing the fastener, the projection 13b offers resistance to movement of the plunger to prevent engagement of the plunger shank with the cam shoulders until the extremity of the grommet has been forced through the member 25. That is, the projection 13b insures proper sealing of the grommet prior to locking the fastener in place.

Reference is now directed to the embodiment shown in FIGS. 16 through 24 in which similar parts and portions bear the same reference numerals as used in conjunction with the first embodiment. Thus, the embodiment shown in FIGS. 16 through 24 include an expansible grommet 1 and an expander plunger 2.

The grommet 2 includes complementary head portions 3 which are not connected by a web.

The grommet includes complementary stem portions 6 having confronting flat walls 7 forming a reduced cylindrical subportion 8 and an enlarged cylindrical subportion 9. In place of the conical end subportion 10 the stem portions are joined by a connecting web 28 which tapers to form a reduced end. Adjacent the web but spaced therefrom, the walls 7 are provided with cam shoulders 12. Also each wall 7 is provided adjacent the head portions 3 with a stop lug 13.

The expander plunger is provided with a handle head 14 from which extends a shank 16 having flat sides 17. Lateral projections 29 adjacent the handle head are intended to be received in the space between the head portions 3. Opposite sides of the shank 16 are provided with latching recesses 19 forming stop shoulders 20. Also the flat sides 17 are provided with retaining recesses 21 and the extremity of the shank is beveled as indicated by 22.

Initially the expansible grommet 1 and expander plunger 2 are joined by frangible connections 23 as in the first described embodiment.

Operation of the embodiment shown in FIGS. 16 through 24 is essentially the same as the embodiment shown in FIGS. 1 through 12. Also the dimensions of the reduced cylindrical subportion 8 and enlarged cylindrical subportion 9 are similarly related to the perforations 26 and 27 of the first and second members 24 and 25 as in the first described embodiment.

Figure 18:
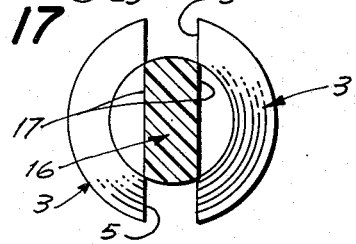
Figure 19:
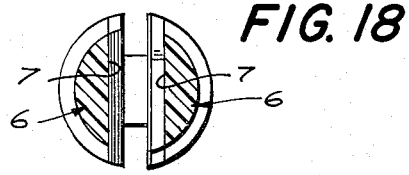
Figure 20:
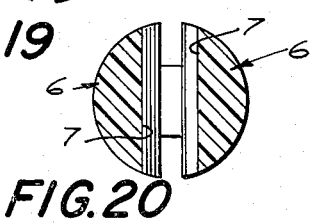
Figure 24:
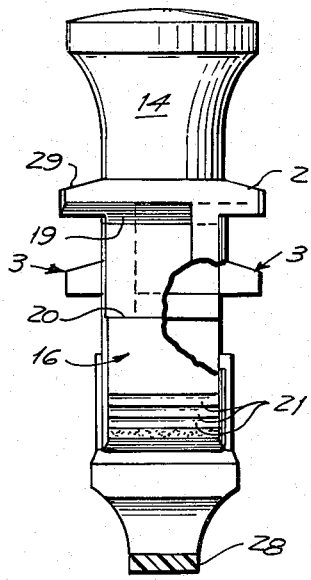
Figure 23:
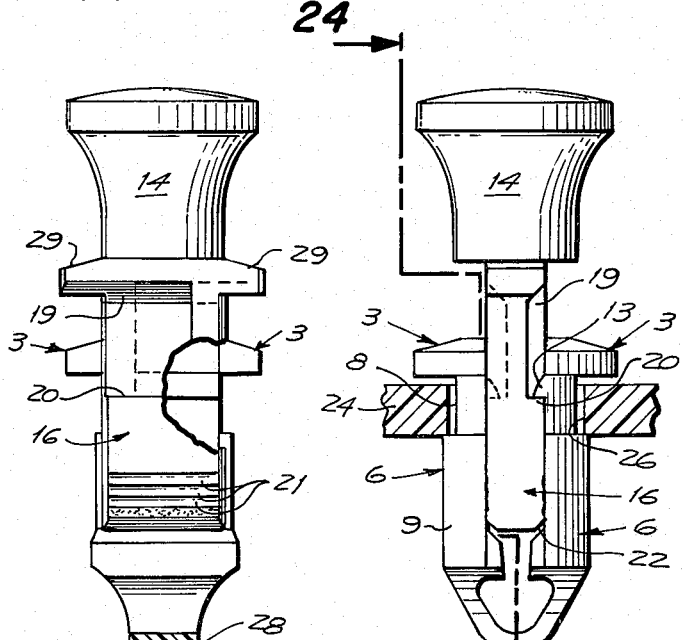

While the plunger remains integrally attached to the grommet 1, the stem portions 6 may be inserted through the perforation 26 by permitting the opposed walls of the enlarged cylindrical subportion 9 to deflect inward the slight amount necessary to pass through the perforation 26. Thus, initially, the removable fastener after being received on the first member 24 appears as shown in FIG. 16. When sufficient force is exerted on the handle head 14 to sever the connections 23, the shank 16 is forced downward between the stop shoulders 20 spreading the stem portions 6 to the extent permitted by the perforation 26 as shown in FIG. 18. Further movement of the shank 16 causes the stop lugs 13 to be received in the lateral recesses 19 and final movement of the shank 16 wedges the remaining recesses between the cam shoulders 12 causing the stem portions 6 to spread sufficiently as to lock tightly within the perforation 27 and expand sufficiently to prevent withdrawal through the second member 25 as shown in FIG. 23. Subsequently the plunger 2 may be withdrawn so as to disengage the cam shoulders 12 and permit radial retraction of the stem portions 6 as shown in FIG. 24, however, the plunger 2 cannot be removed from the grommet 1 due to interengagement of the stop lugs 13 with the stop shoulders 20.

Below the stop shoulders 12 in both embodiments, there is provided a slightly tapered surface which tends to conform and grip the sides of the shank 16 in the region of the recesses 21 so as to provide frictional restraint to withdrawal of the plunger and to prevent the plunger from shaking loose should the fastener be subject to vibration, yet permitting the plunger to be pulled free.

It should be noted that the first embodiment may include the end web 28 as well as the head connecting web 4. Alternatively, the second embodiment may be provided with the web 4 between head portions 3. The purpose in providing both webs is to reduce the chance of failure between the two portions of the grommet, and also permit manufacture of the fastener in smaller sizes than might otherwise be possible. If both webs 4 and 28 are employed in the embodiment shown in FIGS. 1 through 12, the undercut portions of the flanges 11, and channels 18 may be omitted.

The fastener may be formed from a variety of moldable plastic materials as well as metal, the material being determined by the intended use. It will be observed, that in each embodiment no cores are required to mold the fastener, instead a pair of mold plates having the required recesses are used to cast the fastener in a single operation.

It should be noted that the stop lugs 13a as well as the projection 13b shown in FIGS. 13, 14 and 15 may be incorporated in the embodiment shown in FIGS. 16 through 24.

As the fastener is formed of plastic material, the grommet, particularly when secured in position for a long period of time becomes set in an expanded condition and thus requires extra force to reinsert the grommet. Such force may cause the plunger to bottom in the grommet and hold the grommet in its expanded position and prevent reinsertion of the grommet. The embodiment shown in FIGS. 25 through 29 incorporates means for overcoming this condition.

To accomplish this, a radial projection 29 is substituted for the projection 15 and complementary head portions 30 are substituted for the head portions 3. Otherwise, the fastener may be constructed essentially in accordance with either of the previously described embodiments and the parts are similarly identified. The projection 29 and head portions have increased thickness. The side walls 31 of the projection 29 diverge toward the head portions 30 and terminate in laterally spaced cam surfaces 32. The head portions 30 have diverging confronting surfaces 33 which extend radially to receive the projection 29 therebetween.

Operation of the embodiment shown in FIGS. 25 through 29 is as follows:

Initially, the parts of the fastener are connected in the same manner as the other embodiments as shown in FIG. 27 and in the course of securing the fastener to members 24 and 25 for the first time, the operation is the same as previously described, with the exception that extra force is required to expand the head members 30 for insertion of the projection 29 in order to move the plunger from the position shown in FIG. 28 to the position shown in FIG. 29.

To effect removal the reverse operation occurs; that is, the plunger is raised from the position shown in FIG. 29 to the position shown in FIG. 28 or until the stop shoulder 20 and stop lug 13 engage. If the fastener has remained as shown in FIG. 29 for some time, the grommet may not retract fully. Thus, when it is desired to replace the fastener, the sides of the grommet engage the margins of the opening 27 in the member 25 as shown in FIG. 30, causing the cam surfaces 32 of the projection 29 to engage the head portions 30. This prevents further movement until the expanded grommet has been forced into the opening 27 as in FIG. 27 whereupon the projection 29 may be forced between the head portions 30 to the position shown in FIG. 29. In place of a single stop shoulder 20 and stop lug 13, a pair may be provided as indicated in FIGS. 26 and 27.

Having fully described my invention it is to be understood that I am not to be limited to the details herein set forth, but that my invention is of the full scope of the appended claims.

I claim:

1. A fastener for removably joining a first and a second perforated member, comprising:
   a. an expansible grommet having complementary portions joined by a web, the complementary portions including a pair of confronting head portions and stem portions forming spaced confronting walls;
   b. opposed expansion cam shoulders adjacent the extremities of the stem portions;
   c. a latching lug projecting from at least one confronting wall;
   d. an expander plunger including a handle head disposed outwardly of the grommet head portions and a shank dimensioned to fit between the complementary walls;
   e. cam elements carried by the shank engageable with the cam shoulders to spread the cam portions upon inward movement relative to the grommet;
   f. a channel formed in the shank to receive the latching lug and including a shoulder engageable with the latching lug to restrain outward movement of the plunger;
   g. and means initially forming a frangible connection between the head portions of the grommet and the shank of the plunger to hold the plunger in an extended position relative to the grommet until the frangible connection is sheared;
   h. the grommet being insertable into the perforated first and second members and the plunger, upon being subjected to a connection shearing force, movable into expanding engagement with the cam shoulders to expand the grommet into interlocking engagement with the first and second members;
   i. the plunger thereafter being outwardly movable until engagement between the plunger shoulder and grommet latching lug to permit contraction of the latching lug for removal from the second member.

2. A fastener, as defined in claim 1, wherein:
   a. the web extends between the complementary head portions.

3. A fastener, as defined in claim 1, wherein:
   a. the web extends between the extremities of the stem portions.

4. A fastener, as defined in claim 1, wherein:
   a. a first web extends between the complementary head portions;
   b. and a second web extends between the extremities of the stem portions.

5. A fastener, as defined in claim 1, wherein:
   a. the side margins of the grommet stem portions and the plunger shank portions incude interengaging channel and rib elements to restrain movement of the shank portions away from the shank.

6. A fastener for removably joining a first and a second perforated member, comprising:
   a. an expansible grommet having complementary head and stem portions defining confronting walls, the stem portions being insertable through the perforations;
   b. an expander plunger having a handle head and shank, the shank being dimensioned to be received between the confronting walls;
   c. shearable means initially forming an integral connection between the grommet and shank and initially positioning the plunger in extended relation to the grommet, the shearable means being rupturable upon application of a predetermined force on the handle head;
   d. cooperating means carried by the grommet stem portions and plunger shank for spreading the stem portions upon predetermined inward movement of the shank;
   e. and interlocking means operable upon predetermined subsequent outward movement of the plunger shank to prevent disengagement of the plunger from the grommet, the plunger being movable before restrained by the interlocking means to permit disengagement of the cooperating spreading means thereby to permit contraction of the grommet stem portions for release of at least one of the perforated members.

7. A fastener, as defined in claim 6, wherein:
   a. a web joins the grommet head portions;
   b. and guide means limits spreading of the grommet stem portions away from the plunger shank.

8. A fastener, as defined in claim 6, wherein:
   a. a web joins the extremities of the grommet stem portions.

9. A fastener, as defined in claim 6, wherein:
   a. the interlocking means includes a stop lug projecting from at least one of the confronting walls of the grommet, and a corresponding recess provided on the shank of the expander plunger.

10. A fastener, as defined in claim 6, wherein:
    a. the interlocking means includes a stop lug provided on the stem portion of the expander plunger, and a latching surface is provided at a head portion of the grommet.

11. A fastener, as defined in claim 6, wherein:
    a. an interengaging means is provided between the grommet and expander plunger to provide resistance to movement of the plunger into the grommet to facilitate seating of the grommet prior to spreading of the stem portions.

12. A fastener, as defined in claim 6, wherein:
    a. interengaging means carried by the grommet and the plunger relatively positioned for engagement prior to spreading the stem portions to increase the force required to effect spreading the stem portions.

* * * * *